United States Patent
Fan

(10) Patent No.: US 10,623,499 B2
(45) Date of Patent: Apr. 14, 2020

(54) METHOD AND SYSTEM FOR OPERATING AND CONTROLLING DATA, AND USER TERMINAL

(71) Applicant: TENCENT TECHNOLOGY (SHENZHEN) COMPANY LIMITED, Shenzhen (CN)

(72) Inventor: Yu Fan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 130 days.

(21) Appl. No.: 15/830,650

(22) Filed: Dec. 4, 2017

(65) Prior Publication Data

US 2018/0091602 A1    Mar. 29, 2018

Related U.S. Application Data

(63) Continuation of application No. PCT/CN2016/079074, filed on Apr. 12, 2016.

(30) Foreign Application Priority Data

Oct. 13, 2015    (CN) .......................... 2015 1 0671225

(51) Int. Cl.
*H04L 29/08* (2006.01)
*G06F 16/954* (2019.01)
*H04L 29/06* (2006.01)

(52) U.S. Cl.
CPC .......... *H04L 67/141* (2013.01); *G06F 16/954* (2019.01); *H04L 65/4015* (2013.01);
(Continued)

(58) Field of Classification Search
CPC ................ G06F 16/954; H04L 65/1059; H04L 65/4015; H04L 65/4069; H04L 67/02; H04L 67/141
See application file for complete search history.

(56) References Cited

U.S. PATENT DOCUMENTS 6,381,618 B1 * 4/2002 Jones ..................... G06F 16/958
8,650,498 B1 * 2/2014 Mihovilovic ........... H04L 41/22
715/763
(Continued)

FOREIGN PATENT DOCUMENTS

CN    102346740 A    2/2012
CN    103763627 A    4/2014
(Continued)

OTHER PUBLICATIONS

Korean Intellectual Property Office (KIPO) Notification of Reason for Refusal for 10-2017-7037230 dated Jan. 21, 2019 7 Pages (including translation).
(Continued)

*Primary Examiner* — Joe Chacko
(74) *Attorney, Agent, or Firm* — Anova Law Group, PLLC

(57) ABSTRACT

The present disclosure provides a method and system for operating and controlling data, and a user terminal. The method includes: obtaining, by a first user terminal, an operation instruction entered for document data in a first browser application of the first user terminal; obtaining, by the first user terminal, instruction information corresponding to the operation instruction; sending, by the first user terminal, the instruction information to a second user terminal based on the first browser application of the first user terminal; receiving, by the second user terminal, the instruction information sent by the first user terminal; obtaining, by the second user terminal, an operational control instruction corresponding to the instruction information; and operating, by the second user terminal according to the operational control instruction, the document data in a second browser application of the second user terminal.

19 Claims, 8 Drawing Sheets

(52) U.S. Cl.
CPC ...... *H04L 65/4069* (2013.01); *H04L 65/1059* (2013.01); *H04L 67/02* (2013.01)

(56) References Cited

U.S. PATENT DOCUMENTS

| | | | |
|---|---|---|---|
| 10,021,181 B2* | 7/2018 | Endahl | G06F 16/178 |
| 2004/0148406 A1* | 7/2004 | Shima | H04L 29/06 |
| | | | 709/228 |
| 2008/0165807 A1* | 7/2008 | Nilo | H04L 67/104 |
| | | | 370/503 |
| 2012/0101980 A1* | 4/2012 | Taleghani | G06F 17/2288 |
| | | | 707/608 |
| 2013/0132340 A1* | 5/2013 | Jing | G06F 16/1734 |
| | | | 707/610 |
| 2013/0304868 A1* | 11/2013 | Singh | G06Q 10/10 |
| | | | 709/219 |
| 2014/0082151 A1* | 3/2014 | Chen | H04L 67/14 |
| | | | 709/219 |
| 2015/0334182 A1* | 11/2015 | Wu | H04L 67/1095 |
| | | | 707/620 |
| 2015/0339280 A1* | 11/2015 | McLaughlin | G06F 17/24 |
| | | | 726/16 |

FOREIGN PATENT DOCUMENTS

| | | |
|---|---|---|
| JP | 2014165843 A | 9/2014 |
| KR | 20050085021 A | 8/2005 |
| WO | 2015080734 A1 | 6/2015 |

OTHER PUBLICATIONS

The World Intellectual Property Organization (WIPO) International Search Report for PCT/CN2016/079074 dated Jul. 12, 2016 6 Pages (including translation).
Korean Intellectual Property Office (KIPO) Office Action 1 for 20177037230 dated Jul. 31, 2019 7 Pages (including translation).

* cited by examiner

_METHOD AND SYSTEM FOR OPERATING AND CONTROLLING DATA, AND USER TERMINAL_

CROSS-REFERENCES TO RELATED APPLICATIONS

This application is a continuation application of PCT Patent Application No. PCT/CN2016/079074, filed on Apr. 12, 2016, which claims priority to Chinese Patent Application No. 201510671225.4, filed on Oct. 13, 2015 and entitled "METHOD AND SYSTEM FOR OPERATING AND CONTROLLING DATA, AND USER TERMINAL", the entire contents of both of which are incorporated herein by reference.

FIELD OF THE TECHNOLOGY

The present disclosure relates to the field of Internet technologies, and in particular, to a method and system for operating and controlling data, and a user terminal.

BACKGROUND OF THE DISCLOSURE

With continuous development and improvement of Internet technologies, in a process of presenting document data, user terminals can statically share document data. That is, user terminals can transmit document data to each other based on a network. By means of static sharing, required document data may be transferred in time from a personal user terminal of a user to a user terminal that needs to perform a presentation, thereby facilitating usage of a user.

In an existing presentation process, different document data has different data formats. Therefore, it easily occurs that a user terminal that performs a presentation is incompatible with a data format of document data and cannot present the document data. In addition, a user often needs to operate the document data presented on the user terminal, but a presentation process needs to depend on the document data presented on the user terminal. That is, the user cannot leave the user terminal that performs a presentation, and consequently, a presentation effect of the document data is affected.

SUMMARY

Embodiments of the present disclosure provide a method and system for operating and controlling data, and a user terminal, to implement a synchronization operation for document data of multiple user terminals, and improve a presentation effect of the document data.

One aspect of the embodiments of the present disclosure provides a method for operating and controlling data, which may include: obtaining, by a first user terminal, an operation instruction entered for document data in a first browser application of the first user terminal; obtaining, by the first user terminal, instruction information corresponding to the operation instruction; sending, by the first user terminal, the instruction information to a second user terminal based on the first browser application of the first user terminal; receiving, by the second user terminal, the instruction information sent by the first user terminal; obtaining, by the second user terminal, an operational control instruction corresponding to the instruction information; and operating, by the second user terminal according to the operational control instruction, the document data in a second browser application of the second user terminal.

Another aspect of the embodiments of the present disclosure provides a first user terminal, which may include: a memory, and a processor coupled to the memory, the processor being configured to: obtain an operation instruction entered for document data in a first browser application of the first user terminal; obtain instruction information corresponding to the operation instruction; and send the instruction information to a target user terminal based on the first browser application of the first user terminal, so that the target user terminal operates, according to the instruction information, the document data in a second browser application of the target user terminal.

Another aspect of the embodiments of the present disclosure provides a target user terminal, which may include: a memory, and a processor coupled to the memory, the processor being configured to: receive instruction information sent by a controlling user terminal based on a first browser application of the controlling user terminal; obtain an operational control instruction corresponding to the instruction information; and operate, according to the operational control instruction, document data in a second browser application of the target user terminal; the instruction information being obtained by the controlling user terminal according to an operation instruction entered for the document data in the first browser application of the controlling user terminal.

BRIEF DESCRIPTION OF THE DRAWINGS

To describe the technical solutions in the embodiments of the present disclosure or in the existing technologies more clearly, the following briefly describes the accompanying drawings required for describing the embodiments or the existing technologies.

DESCRIPTION OF EMBODIMENTS

Figure 1:
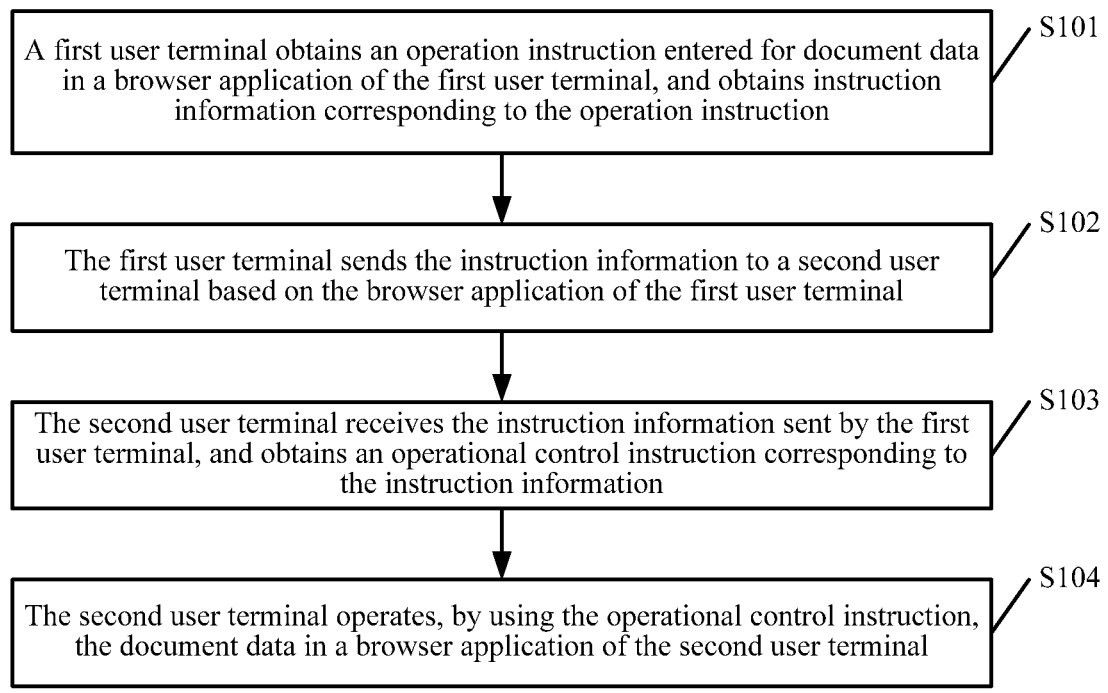
FIG. 1 is a schematic flowchart of a method for operating and controlling data according to an embodiment of the present disclosure.

The following describes the technical solutions in the embodiments of the present disclosure with reference to the accompanying drawings in the embodiments of the present disclosure.

A method for operating and controlling data provided in the embodiments of the present disclosure may be applied to a scenario in which document data is presented, for example, a scenario in which: a first user terminal obtains an operation instruction entered for document data in a browser application of the first user terminal, and obtains instruction information corresponding to the operation instruction; the first user terminal sends the instruction information to a second user terminal based on the browser application of the first user terminal; the second user terminal receives the instruction information sent by the first user terminal, and obtains an operational control instruction corresponding to the instruction information; and the second user terminal operates, by using the operational control instruction, document data in a browser application of the second user terminal. The operation instruction entered by a user on the first user terminal for the document data is converted into the operational control instruction for the document data in the second user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved.

The first user terminal (or a controlling user terminal) in the embodiments of the present disclosure may be a terminal device such as a tablet computer, a smartphone, a notebook computer, a palmtop computer, a personal computer, or a mobile Internet device (MID) that has functions of transmitting and operating document data. The second user terminal (or a target user terminal), different from the first user terminal, may be a terminal device that may also include a tablet computer, a smartphone, a notebook computer, a palmtop computer, a personal computer, and a mobile Internet device (MID) and that has functions of sending/receiving and operating document data. For example, when a user needs to give a presentation, the target user terminal (e.g., a PC in a conference room) includes a display for presenting a document (e.g., a Powerpoint, a keynote, a word document, a media file such as music, animation and movie, etc.). It may be inconvenient to directly control the document using I/O device of the target user terminal. Further, the target user terminal may not be installed with proper application to open/read the to-be-presented document. The user may operate a controlling user terminal (e.g., a personal mobile phone), use a first browser application to access the to-be-presented document. A second browser application on the target user terminal may sync with the first browser application to retrieve the to-be-presented document. The second browser application may open the to-be-presented document with compatible browser plugin. That is, the target user terminal does not need to install specific standalone applications to access to-be-presented document as long as the second browser application is functioning. The first browser application of the controlling user terminal may receive operation instruction from the user and communicate with the second browser application of the target user terminal. That is, the user can operate on the controlling terminal to achieve desired controls (e.g., opening/closing, page flipping, etc.) to the document displayed by the target user terminal.

The following describes the method for operating and controlling data according to the embodiments of the present disclosure in detail with reference to FIG. 1 to FIG. 7.

Referring to FIG. 1, FIG. 1 is a schematic flowchart of a method for operating and controlling data according to an embodiment of the present disclosure. As shown in FIG. 1, a specific process of the method for operating and controlling data is described in this embodiment of the present disclosure from both a first user terminal side and a second user terminal side. The method may include the following step S101 to step S104.

S101. A first user terminal obtains an operation instruction entered for document data in a browser application of the first user terminal, and obtains instruction information corresponding to the operation instruction. The browser application of the first user terminal may also be referred as the first browser application.

Specifically, the first user terminal may detect an operation entered by a user for the document data in the browser application of the first user terminal, such as a double-tap operation on a document identifier corresponding to the document data, and a slide operation on the document data. The first user terminal may convert a detected operation into a corresponding operation instruction. For example, the double-tap operation on the document identifier corresponds to an instruction for invoking the browser application of the first user terminal to open the document data, and the slide operation on the document data corresponds to an instruction for turning pages of the document data. The operation instruction may be any one of an instruction for opening the document data, an instruction for turning pages of the document data, and an instruction for closing the document data. The first user terminal may obtain the instruction information corresponding to the operation instruction. In addition, the first user terminal may operate the document data in the browser application of the first user terminal according to the operation instruction. It should be noted that the instruction information is specifically control information agreed on by the first user terminal and the second user terminal in advance and may be a character string, an instruction identifier, or the like.

It may be understood that a first instruction control list is preset in the first user terminal, and the first instruction control list stores the operation instruction, the instruction information, and a correspondence between the operation instruction and the instruction information.

S102. The first user terminal sends the instruction information to a second user terminal based on the browser application of the first user terminal.

Specifically, the first user terminal may send the instruction information to the second user terminal based on the browser application of the first user terminal.

S103. The second user terminal receives the instruction information sent by the first user terminal, and obtains an operational control instruction corresponding to the instruction information.

Specifically, the second user terminal receives the instruction information sent by the first user terminal. When receiving the instruction information, the second user terminal searches for and obtains an operational control instruction corresponding to the instruction information. The operational control instruction is specifically an instruction for controlling to perform a corresponding operation on document data in a browser application of the second user terminal. It may be understood that a second instruction control list is preset in the second user terminal, and the second instruction control list stores the instruction information, the operational control instruction, and a correspondence between the operational control instruction and the instruction information.

S104. The second user terminal operates, according to the operational control instruction, document data in a browser application of the second user terminal. The browser application of the second user terminal may also be referred as the second browser application.

Specifically, when obtaining the operational control instruction, the second user terminal may operate, by using the operational control instruction, the document data in the browser application of the second user terminal.

Figure 2:
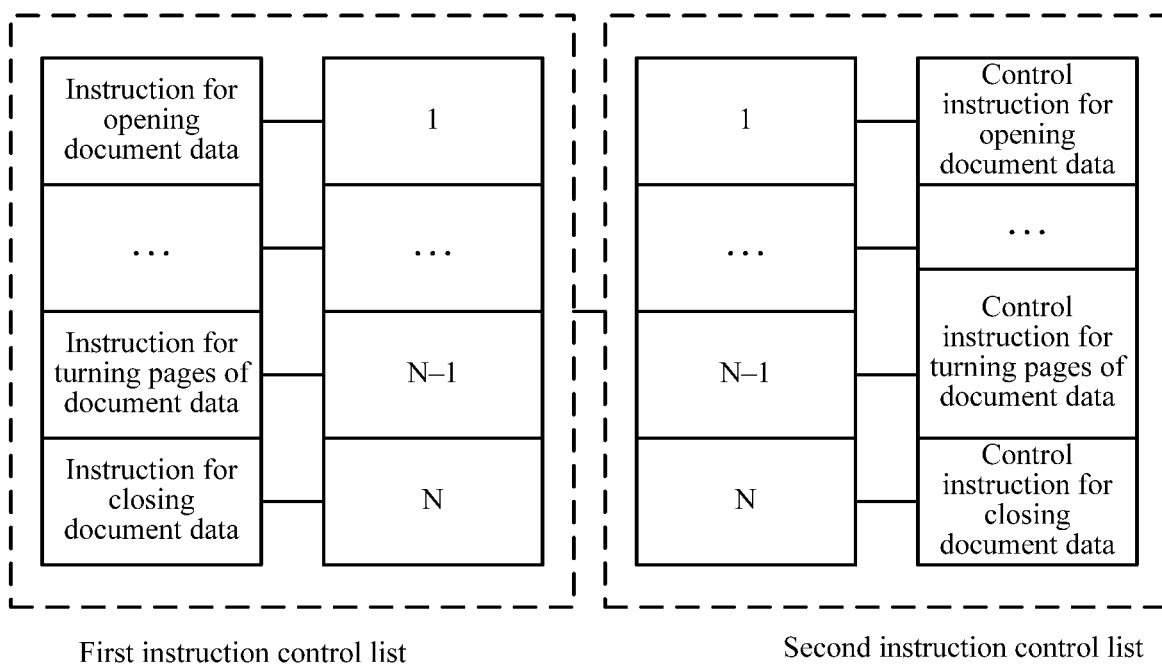
FIG. 2 is a schematic diagram of an example in which an operation instruction is converted into an operational control instruction according to an embodiment of the present disclosure.

Referring to FIG. 2 together, FIG. 2 is a schematic diagram of an example in which an operation instruction is converted into an operational control instruction according to an embodiment of the present disclosure. The first user terminal stores the first instruction control list, and the second user terminal stores the second instruction control list. Different user terminals have different specific operation instructions, and therefore, corresponding instruction information needs to be agreed on in advance, to ensure synchronization between operations of the user terminals.

As shown in FIG. 2, if an entered operation instruction obtained by the first user terminal is an instruction for opening document data, the first user terminal may obtain, from the first instruction control list, instruction information "1" corresponding to the "instruction for opening document data", and send the instruction information "1" and the document data to the second user terminal. In addition, the first user terminal may open the document data by using the browser application of the first user terminal. When obtaining the instruction information "1", the second user terminal may search the second instruction control list to obtain an operational control instruction, that is, "a control instruction for opening document data" corresponding to the instruction information "1". The second user terminal may receive the document data, and perform an operation of opening the document data by using the browser application of the second user terminal.

Similarly, for different operation instructions, the second user terminal may be controlled to obtain corresponding operational control instructions in the foregoing manner. It should be noted that the form of a list is merely an example, the second user terminal may also be controlled to obtain the corresponding operational control instructions by using another mapping relationship, and this also falls within the protection scope of the embodiments of the present disclosure.

In this embodiment of the present disclosure, in a process of presenting document data, by means of instruction information agreed on by browser applications of user terminals, an operation instruction entered by a user on a first user terminal for the document data is converted to an operational control instruction for document data in a second user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved.

Figure 3:
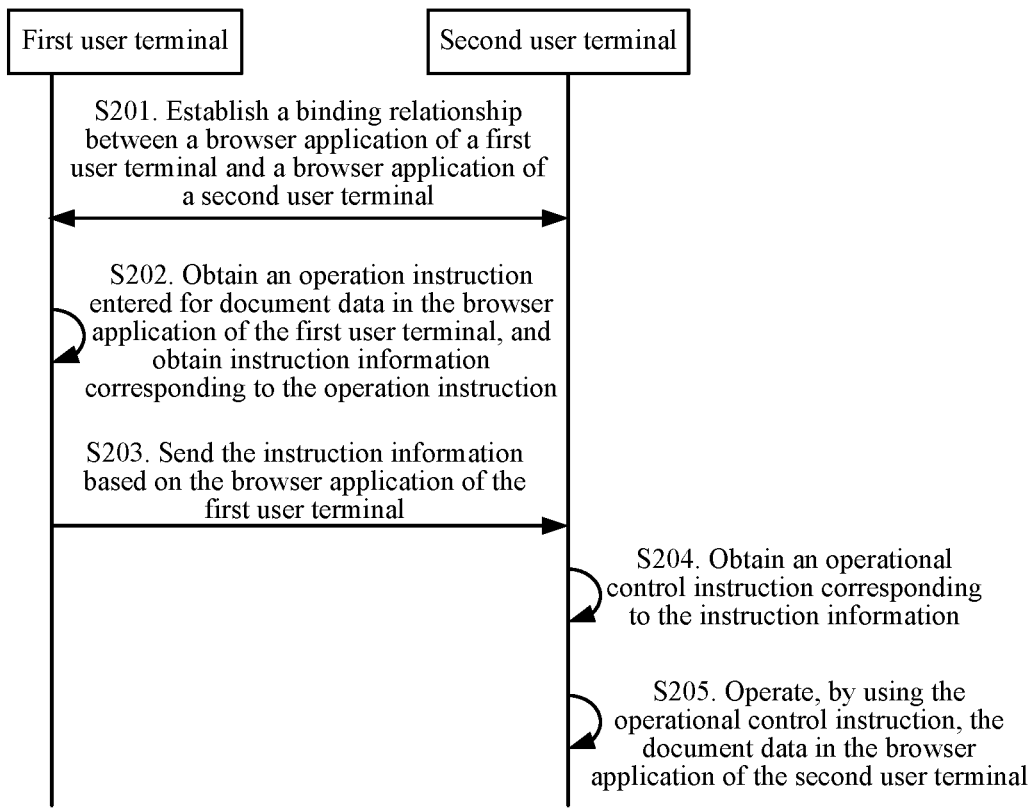
FIG. 3 is a flowchart of a time sequence of a method for operating and controlling data according to an embodiment of the present disclosure.

Referring to FIG. 3, FIG. 3 is a flowchart of a time sequence of another method for operating and controlling data according to an embodiment of the present disclosure. As shown in FIG. 3, a specific process of the method for operating and controlling data is described in this embodiment of the present disclosure from both a first user terminal side and a second user terminal side. The method may include the following step S201 to step S205.

S201. A first user terminal and a second user terminal establish a binding relationship between a first browser application of the first user terminal and a second browser application of the second user terminal.

Specifically, when a synchronization operation for document data is performed, the browser application of the first user terminal and the browser application of the second user terminal need to be used. Therefore, the browser application of the first user terminal and the browser application of the second user terminal need to be bound in advance. That is, the first user terminal and the second user terminal establish the binding relationship between the browser application of the first user terminal and the browser application of the second user terminal. Preferably, the first user terminal and the second user terminal may establish the binding relationship between the browser applications in the following two manners. A specific manner may be selected according to a current network environment or an option of a user.

In a first implementation of this embodiment of the present disclosure, the first user terminal may log in, based on an application identifier, to an application server corresponding to the browser application of the first user terminal, and the second user terminal logs in, based on the application identifier, to the application server corresponding to the browser application of the second user terminal. The application identifier may be specifically an application identifier allocated by the application server when a user registers with the browser application in advance (e.g., a user account associated with the browser application). When learning a login request of a same application identifier, the application server may establish the binding relationship between the browser application of the first user terminal and the browser application of the second user terminal.

In a second implementation of this embodiment of the present disclosure, the first user terminal obtains network address information of the second user terminal, and establishes a communication connection with the second user terminal by using the network address information of the second user terminal, to establish the binding relationship between the browser application of the first user terminal and the browser application of the second user terminal. Alternatively, the second user terminal obtains network address information of the first user terminal, and establishes a communication connection with the first user terminal by using the network address information of the first user terminal, to establish the binding relationship between the browser application of the first user terminal and the browser application of the second user terminal. The network address information may be an Internet Protocol (IP) address and/or a Media Access Control (MAC) address.

It may be understood that the browser application of the first user terminal and the browser application of the second user terminal may be browser applications of a same operator, or may be browser applications of different operators. The browser application of the first user terminal and the browser application of the second user terminal may be browser applications that are agreed on mutual communication and compatibility. In the first implementation, regardless of whether the browser application of the first user terminal and the browser application of the second user terminal are browser applications of a same operator or different operators, by means of the application identifier, the document data in the browser application of the first user terminal and in the browser application of the second user terminal can be synchronized. In the second implementation, regardless of whether the browser application of the first user terminal and the browser application of the second user terminal are browser applications of a same operator or different operators, both the browser application of the first user terminal and the browser application of the second user terminal can recognize each other and synchronize the document data.

That is, S201 further includes, when the binding relationship is established, synchronizing, by the first browser application and the second browser application, the document data. Specifically, in the first implementation, for example, the first browser application may upload the document data to the application server, the document data being associated with the application identifier. The application server can, when detecting that the second browser application is logged in with the same application identifier, send the document data to the second browser application. Alternatively, in the second implementation, for example, the first browser application can directly send the document data to the second browser application based on the network address information. Further, in some embodiments, when document data on the first browser application and the second browser have discrepancies, a latest version may be chosen as the document data, or the version on the first user terminal is chosen as the document data.

In some embodiments, the first and second browser application may include a specific user interface to establish binding relationship and access/control the document data. The user interface may be triggered by a functional button on the browser application or may be a webpage hosted by the application server accessible through certain uniform resource locator (URL). The browser application allows the user to select document data on local storage or cloud storage to be synchronized. The browser application includes plug-in compatible for controlling the document data (e.g., open, read, edit, etc.). If the document data is in a format not supported by current plug-ins, the browser application may prompt the user to retrieve compatible plug-in online (e.g., based on a suffix of document data file). In other words, a format of the document data is compatible with a first plug-in of the first browser application, and is compatible with a second plug-in of the second browser application. Alternatively, the application server may process original document data, convert the document data in a format compatible with the target browser application and send the converted document data to the target browser application for presentation.

S202. The first user terminal obtains an operation instruction entered for document data in the browser application of the first user terminal, and obtains instruction information corresponding to the operation instruction.

S203. The first user terminal sends the instruction information to the second user terminal based on the browser application of the first user terminal.

S204. The second user terminal receives the instruction information sent by the first user terminal, and obtains an operational control instruction corresponding to the instruction information.

S205. The second user terminal operates, by using the operational control instruction, document data in the browser application of the second user terminal.

For a specific description of the steps S201 to S205 in this embodiment of the present disclosure, refer to the steps S101 to S104 in the embodiment shown in FIG. 1, and details are not described herein again.

In this embodiment of the present disclosure, in a process of presenting document data, by means of instruction information agreed on by browser applications of user terminals, an operation instruction entered by a user on a first user terminal for the document data is converted into an operational control instruction for document data in a second user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

It should be noted that the first user terminal and the second user terminal are named merely to distinguish a controlling terminal from a controlled terminal. The first user terminal is configured to control, based on an obtained operation instruction, to perform a corresponding operation on the document data in the browser application of the second user terminal, and may be referred to as a controlling user terminal. The second user terminal is configured to: receive the instruction information sent by the first user terminal, and perform a corresponding operation on the document data in the browser application of the second user terminal, and may be referred to as a target user terminal. The following separately describes a specific execution process of the controlling user terminal and the target user terminal.

Figure 4:
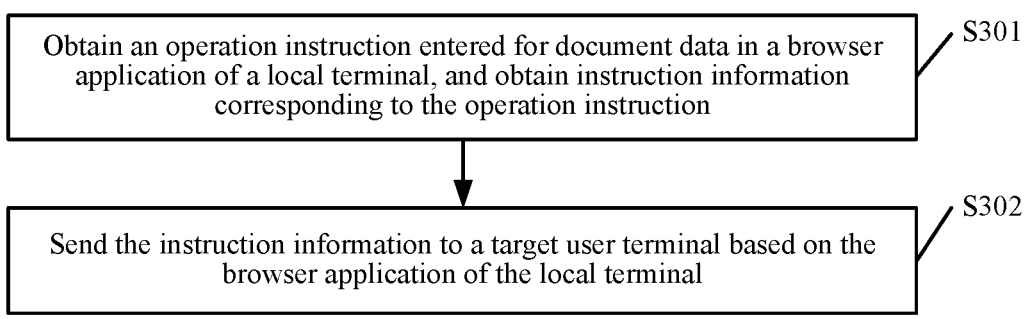
FIG. 4 is a schematic flowchart of another method for operating and controlling data according to an embodiment of the present disclosure.

Referring to FIG. 4, FIG. 4 is a flowchart of a time sequence of another method for operating and controlling data according to an embodiment of the present disclosure. As shown in FIG. 4, a specific process of the method for operating and controlling data is described in this embodiment of the present disclosure from a perspective of a controlling user terminal. The method may include the following step S301 and step S302.

S301. Obtain an operation instruction entered for document data in a browser application of a local terminal, and obtain instruction information corresponding to the operation instruction.

Specifically, the controlling user terminal may detect an operation entered by a user for the document data in the browser application of the controlling user terminal, such as a double-tap operation on a document identifier corresponding to the document data, and a slide operation on the document data. The controlling user terminal may convert a detected operation into a corresponding operation instruction. For example, the double-tap operation on the document identifier corresponds to an instruction for invoking the browser application of the controlling user terminal to open the document data, and the slide operation on the document data corresponds to an instruction for turning pages of the document data. The operation instruction may be any one of an instruction for opening the document data, an instruction for turning pages of the document data, and an instruction for closing the document data. The controlling user terminal may obtain the instruction information corresponding to the operation instruction. In addition, the controlling user terminal may operate the document data in the browser application of the controlling user terminal according to the operation instruction. It should be noted that the instruction information is specifically control information agreed on by the controlling user terminal and the target user terminal in advance and may be a character string, an instruction identifier, or the like.

It may be understood that a first instruction control list is preset in the controlling user terminal, and the first instruction control list stores the operation instruction, the instruction information, and a correspondence between the operation instruction and the instruction information.

S302. Send the instruction information to a target user terminal based on the browser application of the local terminal.

Specifically, the controlling user terminal may send the instruction information to the target user terminal based on the browser application of the controlling user terminal. The target user terminal receives the instruction information sent by the controlling user terminal. When receiving the instruction information, the target user terminal searches for and obtains an operational control instruction corresponding to the instruction information. The operational control instruction is specifically an instruction for controlling to perform a corresponding operation on document data in a browser application of the target user terminal. It may be understood that a second instruction control list is preset in the target user terminal, and the second instruction control list stores the instruction information, the operational control instruction, and a correspondence between the operational control instruction and the instruction information. When obtaining the operational control instruction, the target user terminal may operate, by using the operational control instruction, the document data in the browser application of the target user terminal.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved.

Figure 5:
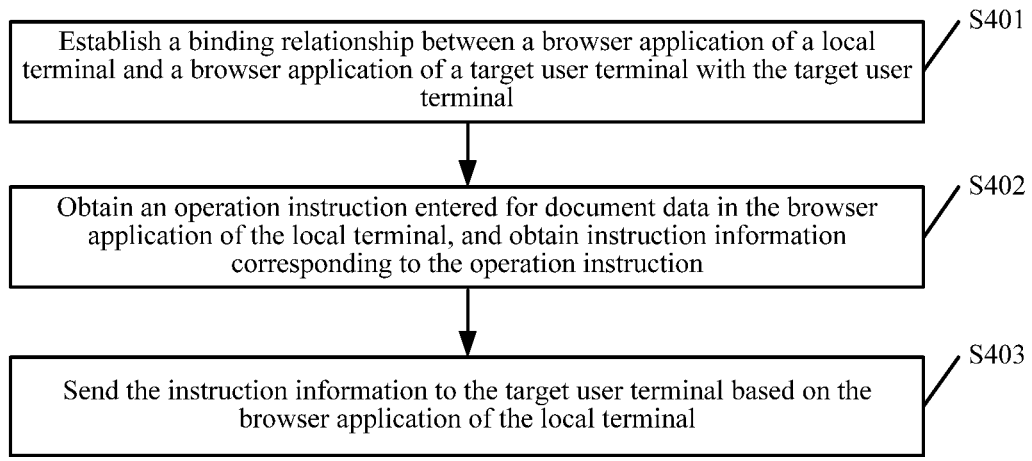
FIG. 5 is a schematic flowchart of another method for operating and controlling data according to an embodiment of the present disclosure.

Referring to FIG. 5, FIG. 5 is a flowchart of a time sequence of another method for operating and controlling data according to an embodiment of the present disclosure. As shown in FIG. 5, a specific process of the method for operating and controlling data is described in this embodiment of the present disclosure from a perspective of a controlling user terminal. The method may include the following step S401 to step S403.

S401. Establish a binding relationship between a browser application of a local terminal and a browser application of a target user terminal with the target user terminal.

Specifically, when a synchronization operation for document data is performed, the browser application of the controlling user terminal and the browser application of the target user terminal need to be used. Therefore, the browser application of the controlling user terminal and the browser application of the target user terminal need to be bound in advance. That is, the controlling user terminal and the target user terminal establish the binding relationship between the browser application of the controlling user terminal and the browser application of the target user terminal. Preferably, the controlling user terminal and the target user terminal may establish the binding relationship between the browser applications in the following two manners. A specific manner may be selected according to a current network environment or an option of a user.

In a first implementation of this embodiment of the present disclosure, the controlling user terminal may log in, based on an application identifier, to an application server corresponding to the browser application of the controlling user terminal, and the target user terminal logs in, based on the application identifier, to the application server corresponding to the browser application of the target user terminal. The application identifier may be specifically an application identifier allocated by the application server when a user registers with the browser application in advance. When learning a login request of a same application identifier, the application server may establish the binding relationship between the browser application of the controlling user terminal and the browser application of the target user terminal.

In a second implementation of this embodiment of the present disclosure, the controlling user terminal obtains network address information of the target user terminal, and establishes a communication connection with the target user terminal by using the network address information of the target user terminal, to establish the binding relationship between the browser application of the controlling user terminal and the browser application of the target user terminal. The network address information may be an IP address and/or a MAC address.

It may be understood that the browser application of the controlling user terminal and the browser application of the target user terminal may be browser applications of a same operator, or may be browser applications of different operators. The browser application of the controlling user terminal and the browser application of the target user terminal may be browser applications that are agreed on in advance to be shared. In the first implementation, regardless of whether the browser application of the controlling user terminal and the browser application of the target user terminal are browser applications of a same operator or different operators, by means of the application identifier, the document data in the browser application of the controlling user terminal and in the browser application of the target user terminal can be synchronized. In the second implementation, regardless of whether the browser application of the controlling user terminal and the browser application of the target user terminal are browser applications of a same operator or different operators, both the browser application of the controlling user terminal and the browser application of the target user terminal can recognize each other and synchronize the document data.

S402. Obtain an operation instruction entered for document data in the browser application of the local terminal, and obtain instruction information corresponding to the operation instruction.

S403. Send the instruction information to the target user terminal based on the browser application of the local terminal.

For a specific description of the steps S402 and S403 in this embodiment of the present disclosure, refer to the steps S301 and S302 in the embodiment shown in FIG. 4, and details are not described herein again.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

Figure 6:
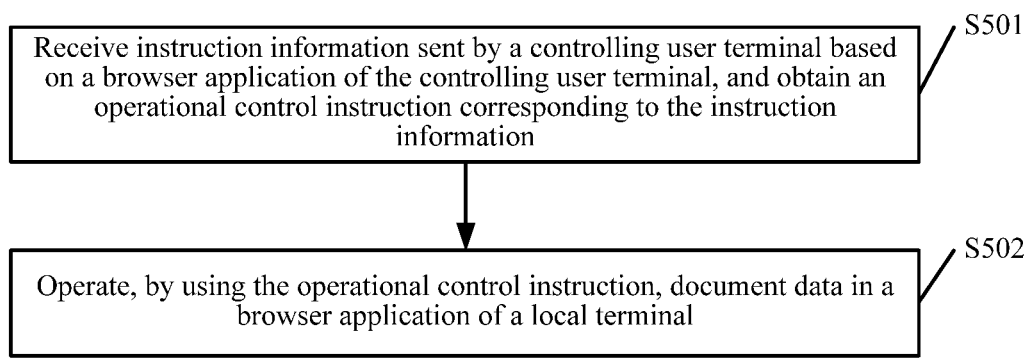
FIG. 6 is a schematic flowchart of another method for operating and controlling data according to an embodiment of the present disclosure.

Referring to FIG. 6, FIG. 6 is a flowchart of a time sequence of another method for operating and controlling data according to an embodiment of the present disclosure. As shown in FIG. 6, a specific process of the method for operating and controlling data is described in this embodiment of the present disclosure from a perspective of a target user terminal. The method may include the following step S501 and step S502.

S501. Receive instruction information sent by a controlling user terminal based on a browser application of the controlling user terminal, and obtain an operational control instruction corresponding to the instruction information.

Specifically, the controlling user terminal may detect an operation entered by a user for document data in the browser application of the controlling user terminal, such as a double-tap operation on a document identifier corresponding to the document data, and a slide operation on the document data. The controlling user terminal may convert a detected operation into a corresponding operation instruction. For example, the double-tap operation on the document identifier corresponds to an instruction for invoking the browser application of the controlling user terminal to open the document data, and the slide operation on the document data corresponds to an instruction for turning pages of the document data. The operation instruction may be any one of an instruction for opening the document data, an instruction for turning pages of the document data, and an instruction for closing the document data. The controlling user terminal may obtain the instruction information corresponding to the operation instruction. In addition, the controlling user terminal may operate the document data in the browser application of the controlling user terminal according to the operation instruction. It should be noted that the instruction information is specifically control information agreed on by the controlling user terminal and the target user terminal in advance and may be a character string, an instruction identifier, or the like. It may be understood that a first instruction control list is preset in the controlling user terminal, and the first instruction control list stores the operation instruction, the instruction information, and a correspondence between the operation instruction and the instruction information. The controlling user terminal may send the instruction information to the target user terminal based on the browser application of the controlling user terminal.

The target user terminal receives the instruction information sent by the controlling user terminal. When receiving the instruction information, the target user terminal searches for and obtains an operational control instruction corresponding to the instruction information. The operational control instruction is specifically an instruction for controlling to perform a corresponding operation on document data in a browser application of the target user terminal. It may be understood that a second instruction control list is preset in the target user terminal, and the second instruction control list stores the instruction information, the operational control instruction, and a correspondence between the operational control instruction and the instruction information.

S502. Operate, by using the operational control instruction, document data in a browser application of the local terminal.

Specifically, when obtaining the operational control instruction, the target user terminal may operate, by using the operational control instruction, the document data in the browser application of the target user terminal.

In this embodiment of the present disclosure, in a process of presenting document data, by means of instruction information agreed on by browser applications of user terminals, an operation instruction by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved.

Figure 7:
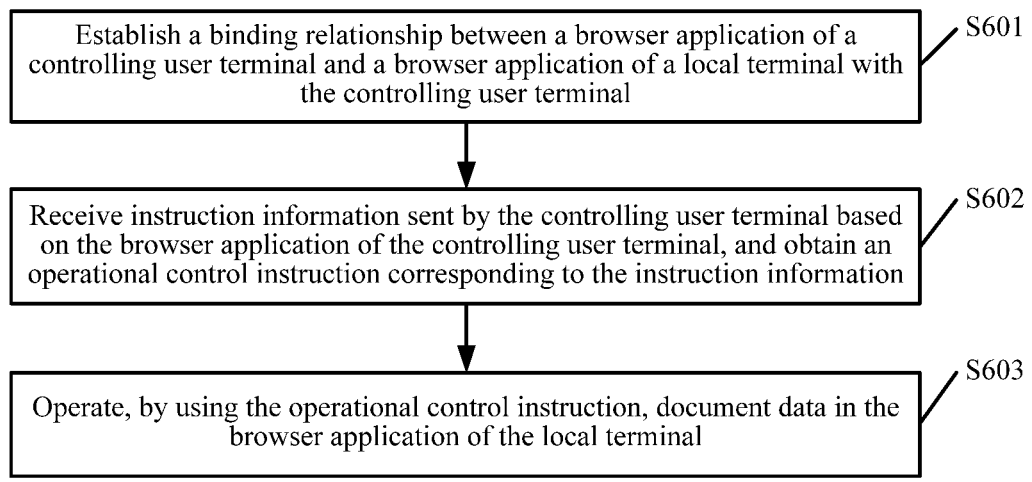
FIG. 7 is a schematic flowchart of another method for operating and controlling data according to an embodiment of the present disclosure.

Referring to FIG. 7, FIG. 7 is a flowchart of a time sequence of another method for operating and controlling data according to an embodiment of the present disclosure. As shown in FIG. 7, a specific process of the method for operating and controlling data is described in this embodiment of the present disclosure from a perspective of a target user terminal. The method may include the following step S601 to step S603.

S601. Establish a binding relationship between a browser application of a controlling user terminal and a browser application of the local terminal with the controlling user terminal.

Specifically, when a synchronization operation for document data is performed, the browser application of the controlling user terminal and the browser application of the target user terminal need to be used. Therefore, the browser application of the controlling user terminal and the browser application of the target user terminal need to be bound in advance. That is, the controlling user terminal and the target user terminal establish the binding relationship between the browser application of the controlling user terminal and the browser application of the target user terminal. Preferably, the controlling user terminal and the target user terminal may establish the binding relationship between the browser applications in the following two manners. A specific manner may be selected according to a current network environment or an option of a user.

In a first implementation of this embodiment of the present disclosure, the controlling user terminal may log in, based on an application identifier, to an application server corresponding to the browser application of the controlling user terminal, and the target user terminal logs in, based on the application identifier, to the application server corresponding to the browser application of the target user terminal. The application identifier may be specifically an application identifier allocated by the application server when a user registers with the browser application in advance. When learning a login request of a same application identifier, the application server may establish the binding relationship between the browser application of the controlling user terminal and the browser application of the target user terminal.

In a second implementation of this embodiment of the present disclosure, the target user terminal obtains network address information of the controlling user terminal, and establishes a communication connection with the controlling user terminal by using the network address information of the controlling user terminal, to establish the binding relationship between the browser application of the controlling user terminal and the browser application of the target user terminal. The network address information may be an IP address and/or a MAC address.

It may be understood that the browser application of the controlling user terminal and the browser application of the target user terminal may be browser applications of a same operator, or may be browser applications of different operators. The browser application of the controlling user terminal and the browser application of the target user terminal may be browser applications that are agreed on in advance to be shared. In the first implementation, regardless of whether the browser application of the controlling user terminal and the browser application of the target user terminal are browser applications of a same operator or different operators, by means of the application identifier, the document data in the browser application of the controlling user terminal and in the browser application of the target user terminal can be synchronized. In the second implementation, regardless of whether the browser application of the controlling user terminal and the browser application of the target user terminal are browser applications of a same operator or different operators, both the browser application of the controlling user terminal and the browser application of the target user terminal can recognize each other and synchronize the document data.

S602. Receive instruction information sent by the controlling user terminal based on the browser application of the controlling user terminal, and obtain an operational control instruction corresponding to the instruction information.

S603. Operate, by using the operational control instruction, document data in the browser application of the local terminal.

For a specific description of the steps S602 and S603 in this embodiment of the present disclosure, refer to the steps S501 and S502 in the embodiment shown in FIG. 6, and details are not described herein again.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

Figure 8:
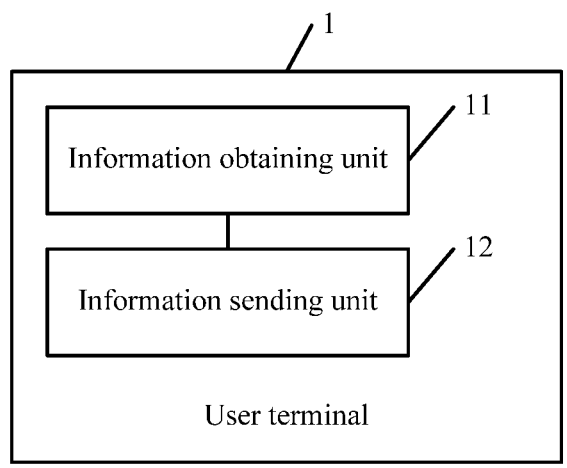
FIG. 8 is a schematic structural diagram of a user terminal according to an embodiment of the present disclosure.
Figure 9:
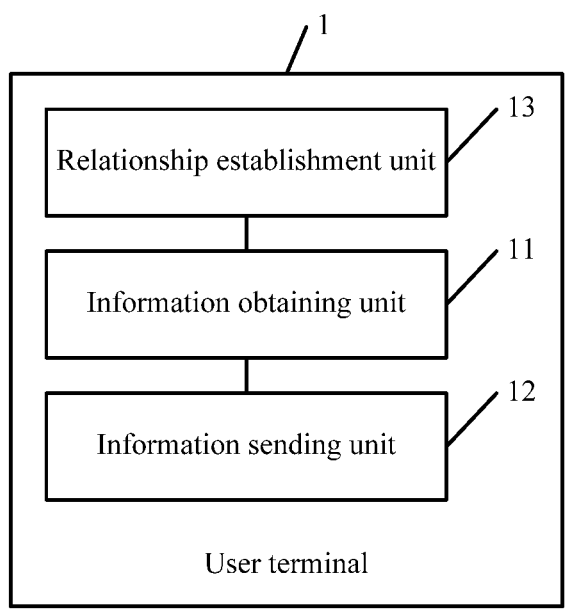
FIG. 9 is a schematic structural diagram of another user terminal according to an embodiment of the present disclosure.

The following describes the controlling user terminal according to the embodiments of the present disclosure in detail with reference to FIG. 8 and FIG. 9. It should be noted that a user terminal shown in FIG. 8 and FIG. 9 is configured to perform the methods in the embodiments shown in FIG. 4 and FIG. 5 of the present disclosure. For ease of description, only a part related to the embodiments of the present disclosure is shown. For specific technical details that are not disclosed, refer to the embodiments shown in FIG. 4 and FIG. 5 of the present disclosure.

Referring to FIG. 8, FIG. 8 is a schematic structural diagram of a user terminal according to an embodiment of the present disclosure. As shown in FIG. 8, the user terminal 1 in this embodiment of the present disclosure may include an information obtaining unit 11 and an information sending unit 12.

The information obtaining unit 11 is configured to: obtain an operation instruction entered for document data in a browser application of the user terminal 1, and obtain instruction information corresponding to the operation instruction.

During specific implementation, the user terminal 1 may detect an operation entered by a user for the document data in the browser application of the user terminal 1, such as a double-tap operation on a document identifier corresponding to the document data, and a slide operation on the document data. The information obtaining unit 11 may convert a detected operation into a corresponding operation instruction. For example, the double-tap operation on the document identifier corresponds to an instruction for invoking the browser application of the user terminal 1 to open the document data, and the slide operation on the document data corresponds to an instruction for turning pages of the document data. The operation instruction may be any one of an instruction for opening the document data, an instruction for turning pages of the document data, and an instruction for closing the document data. The information obtaining unit 11 may obtain the instruction information corresponding to the operation instruction. In addition, the user terminal 1 may operate the document data in the browser application of the controlling user terminal 1 according to the operation instruction. It should be noted that the instruction information is specifically control information agreed on by the user terminal 1 and the target user terminal in advance and may be a character string, an instruction identifier, or the like.

It may be understood that a first instruction control list is preset in the user terminal 1, and the first instruction control list stores the operation instruction, the instruction information, and a correspondence between the operation instruction and the instruction information.

The information sending unit 12 is configured to send the instruction information to a target user terminal based on the browser application of the user terminal 1.

During specific implementation, the information sending unit 12 may send the instruction information to the target user terminal based on the browser application of the user terminal 1. The target user terminal receives the instruction information sent by the information sending unit 12 of the user terminal 1. When receiving the instruction information, the target user terminal searches for and obtains an operational control instruction corresponding to the instruction information. The operational control instruction is specifically an instruction for controlling to perform a corresponding operation on document data in a browser application of the target user terminal. It may be understood that a second instruction control list is preset in the target user terminal, and the second instruction control list stores the instruction information, the operational control instruction, and a correspondence between the operational control instruction and the instruction information. When obtaining the operational control instruction, the target user terminal may operate, by using the operational control instruction, the document data in the browser application of the target user terminal.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved.

Referring to FIG. 9, FIG. 9 is a schematic structural diagram of another user terminal according to an embodiment of the present disclosure. As shown in FIG. 9, the user terminal 1 in this embodiment of the present disclosure may include an information obtaining unit 11, an information sending unit 12, and a relationship establishment unit 13. For structures of the information obtaining unit 11 and the information sending unit 12, refer to the specific description of the embodiment shown in FIG. 8, and details are not described herein again.

The relationship establishment unit 13 is configured to establish a binding relationship between the browser application of the user terminal 1 and the browser application of the target user terminal with the target user terminal.

During specific implementation, when a synchronization operation for document data is performed, the browser application of the user terminal 1 and the browser application of the target user terminal need to be used. Therefore, the browser application of the user terminal 1 and the browser application of the target user terminal need to be bound in advance. That is, the user terminal 1 and the target user terminal establish the binding relationship between the browser application of the user terminal 1 and the browser application of the target user terminal. Preferably, the user terminal 1 and the target user terminal may establish the binding relationship between the browser applications in the following two manners. A specific manner may be selected according to a current network environment or an option of a user.

In a first implementation of this embodiment of the present disclosure, the relationship establishment unit 13 may log in, based on an application identifier, to an application server corresponding to the browser application of the user terminal 1, and the target user terminal logs in, based on the application identifier, to the application server corresponding to the browser application of the target user terminal. The application identifier may be specifically an application identifier allocated by the application server when a user registers with the browser application in advance. When learning a login request of a same application identifier, the application server may establish the binding relationship between the browser application of the user terminal 1 and the browser application of the target user terminal.

In a second implementation of this embodiment of the present disclosure, the relationship establishment unit 13 obtains network address information of the target user terminal, and establishes a communication connection with the target user terminal by using the network address information of the target user terminal, to establish the binding relationship between the browser application of the user terminal 1 and the browser application of the target user terminal. The network address information may be an IP address and/or a MAC address.

It may be understood that the browser application of the user terminal 1 and the browser application of the target user terminal may be browser applications of a same operator, or may be browser applications of different operators. The browser application of the user terminal 1 and the browser application of the target user terminal may be browser applications that are agreed on in advance to be shared. In the first implementation, regardless of whether the browser application of the user terminal 1 and the browser application of the target user terminal are browser applications of a same operator or different operators, by means of the application identifier, the document data in the browser application of the user terminal 1 and in the browser application of the target user terminal can be synchronized. In the second implementation, regardless of whether the browser application of the user terminal 1 and the browser application of the target user terminal are browser applications of a same operator or different operators, both the browser application of the user terminal 1 and the browser application of the target user terminal can recognize each other and synchronize the document data.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

Figure 10:
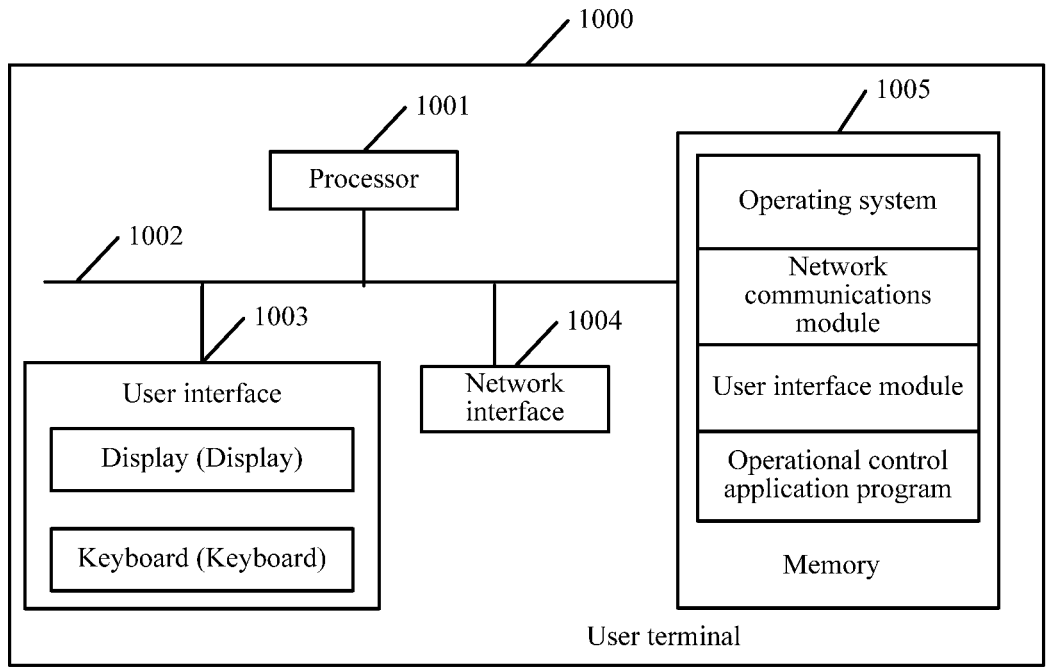
FIG. 10 is a schematic structural diagram of another user terminal according to an embodiment of the present disclosure.

Referring to FIG. 10, FIG. 10 is a schematic structural diagram of another user terminal according to an embodiment of the present disclosure. As shown in FIG. 10, the user terminal 1000 may include at least one processor 1001 such as a CPU, at least one network interface 1004, a user interface 1003, a memory 1005, and at least one communications bus 1002. The communications bus 1002 is configured to implement connection and communication between the components. The user interface 1003 may include a display, a keyboard, and optionally, the user interface 1003 may further include a standard wired interface and/or a standard wireless interface. Optionally, the network interface 1004 may include a standard wired interface and/or a standard wireless interface (such as a WiFi interface). The memory 1005 may be a high-speed RAM memory, or may be a non-volatile memory, for example, at least one magnetic disk memory. Optionally, the memory 1005 may further be at least one storage apparatus that is located far away from the processor 1001. As shown in FIG. 10, the memory 1005, which is used as a computer storage medium, may include an operating system, a network communications module, a user interface module, and an operational control application program.

In the user terminal 1000 shown in FIG. 10, the user interface 1003 is mainly configured to: provide an input interface for a user, and obtain data entered by the user. The network interface 1004 is mainly configured to transmit data and an instruction with a target user terminal. The processor 1001 may be configured to invoke the operational control application program stored in the memory 1005 and specifically perform the following operations:

obtaining an operation instruction entered for document data in a browser application of the user terminal, and obtaining instruction information corresponding to the operation instruction; and sending the instruction information to a target user terminal based on the browser application of the user terminal, so that the target user terminal operates, according to the instruction information, the document data in a second browser application of the target user terminal.

In an embodiment, before performing the step of obtaining an operation instruction entered for document data in a browser application of the user terminal, the processor 1001 further performs the following operation:

establishing a binding relationship between the browser application of the user terminal 1000 and the browser application of the target user terminal with the target user terminal.

In an embodiment, when performing the step of establishing a binding relationship between the browser application of the user terminal 1000 and the browser application of the target user terminal with the target user terminal, the processor 1001 specifically performs the following operations:

logging in, based on an application identifier, to an application server corresponding to the browser application of the user terminal 1000, so that the application server establishes the binding relationship between the browser application of the user terminal 1000 and the browser application of the target user terminal; or obtaining network address information of the target user terminal, and establishing a communication connection with the target user terminal by using the network address information of the target user terminal, to establish the binding relationship between the browser application of the user terminal 1000 and the browser application of the target user terminal.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

Figure 11:
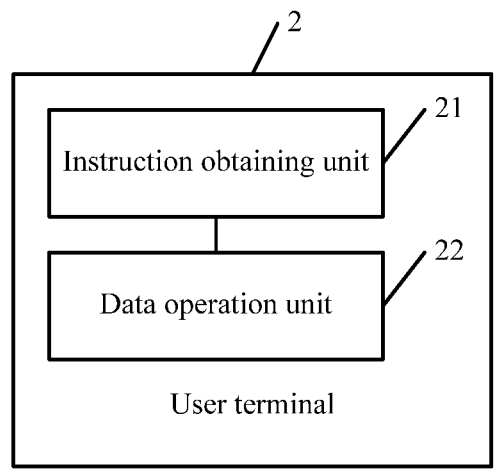
FIG. 11 is a schematic structural diagram of another user terminal according to an embodiment of the present disclosure.
Figure 12:
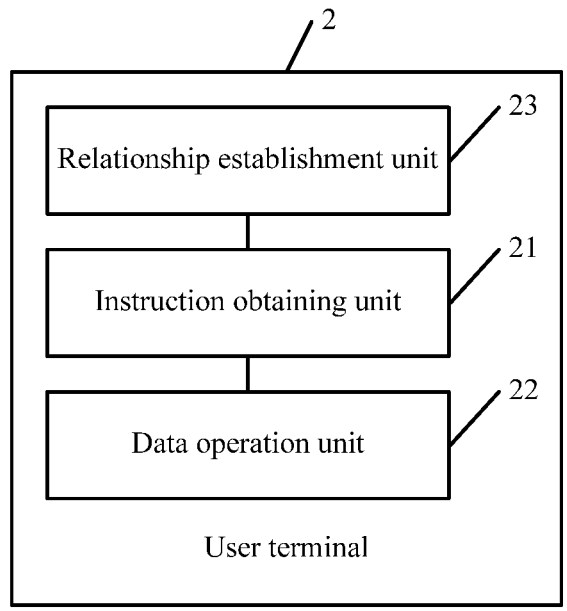
FIG. 12 is a schematic structural diagram of another user terminal according to an embodiment of the present disclosure.

The following describes the target user terminal according to the embodiments of the present disclosure in detail with reference to FIG. 11 and FIG. 12. It should be noted that a user terminal shown in FIG. 11 and FIG. 12 is configured to perform the methods in the embodiments shown in FIG. 6 and FIG. 7 of the present disclosure. For ease of description, only a part related to the embodiments of the present disclosure is shown. For specific technical details that are not disclosed, refer to the embodiments shown in FIG. 6 and FIG. 7 of the present disclosure.

Referring to FIG. 11, FIG. 11 is a schematic structural diagram of another user terminal according to an embodiment of the present disclosure. As shown in FIG. 11, the user terminal 2 in this embodiment of the present disclosure may include an instruction obtaining unit 21 and a data operation unit 22.

The instruction obtaining unit 21 is configured to: receive instruction information sent by a controlling user terminal based on a browser application of the controlling user terminal, and obtain an operational control instruction corresponding to the instruction information.

During specific implementation, the controlling user terminal may detect an operation entered by a user for document data in the browser application of the controlling user terminal, such as a double-tap operation on a document identifier corresponding to the document data, and a slide operation on the document data. The controlling user terminal may convert a detected operation into a corresponding operation instruction. For example, the double-tap operation on the document identifier corresponds to an instruction for invoking the browser application of the controlling user terminal to open the document data, and the slide operation on the document data corresponds to an instruction for turning pages of the document data. The operation instruction may be any one of an instruction for opening the document data, an instruction for turning pages of the document data, and an instruction for closing the document data. The controlling user terminal may obtain the instruction information corresponding to the operation instruction. In addition, the controlling user terminal may operate the document data in the browser application of the controlling user terminal according to the operation instruction. It should be noted that the instruction information is specifically control information agreed on by the controlling user terminal and the user terminal 2 in advance and may be a character string, an instruction identifier, or the like. It may be understood that a first instruction control list is preset in the controlling user terminal, and the first instruction control list stores the operation instruction, the instruction information, and a correspondence between the operation instruction and the instruction information. The controlling user terminal may send the instruction information to the user terminal 2 based on the browser application of the controlling user terminal.

The instruction obtaining unit 21 receives the instruction information sent by the controlling user terminal. When receiving the instruction information, the instruction obtaining unit 21 searches for and obtains an operational control instruction corresponding to the instruction information. The operational control instruction is specifically an instruction for controlling to perform a corresponding operation on document data in a browser application of the user terminal 2. It may be understood that a second instruction control list is preset in the user terminal 2, and the second instruction control list stores the instruction information, the operational control instruction, and a correspondence between the operational control instruction and the instruction information.

The data operation unit 22 is configured to operate, according to the operational control instruction, document data in a browser application of the user terminal 2.

During specific implementation, when obtaining the operational control instruction, the instruction obtaining unit 21 may instruct the data operation unit 22 to operate, by using the operational control instruction, the document data in the browser application of the user terminal 2.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved.

Referring to FIG. 12, FIG. 12 is a schematic structural diagram of another user terminal according to an embodiment of the present disclosure. As shown in FIG. 12, the user terminal 2 in this embodiment of the present disclosure may include an instruction obtaining unit 21, a data operation unit 22, and a relationship establishment unit 23. For structures of the instruction obtaining unit 21 and the data operation unit 22, refer to the specific description of the embodiment shown in FIG. 11, and details are not described herein again.

The relationship establishment unit 23 is configured to establish a binding relationship between the browser application of the controlling user terminal and the browser application of the user terminal 2 with the controlling user terminal.

During specific implementation, when a synchronization operation for document data is performed, the browser application of the controlling user terminal and the browser application of the user terminal 2 need to be used. Therefore, the browser application of the controlling user terminal and the browser application of the user terminal 2 need to be bound in advance. That is, the controlling user terminal and the user terminal 2 establish the binding relationship between the browser application of the controlling user terminal and the browser application of the user terminal 2.

Preferably, the controlling user terminal and the user terminal 2 may establish the binding relationship between the browser applications in the following two manners. A specific manner may be selected according to a current network environment or an option of a user.

In a first implementation of this embodiment of the present disclosure, the controlling user terminal may log in, based on an application identifier, to an application server corresponding to the browser application of the controlling user terminal, and the relationship establishment unit 23 logs in, based on the application identifier, to the application server corresponding to the browser application of the user terminal 2. The application identifier may be specifically an application identifier allocated by the application server when a user registers with the browser application in advance. When learning a login request of a same application identifier, the application server may establish the binding relationship between the browser application of the controlling user terminal and the browser application of the user terminal 2.

In a second implementation of this embodiment of the present disclosure, the relationship establishment unit 23 obtains network address information of the controlling user terminal, and establishes a communication connection with the controlling user terminal by using the network address information of the controlling user terminal, to establish the binding relationship between the browser application of the controlling user terminal and the browser application of the user terminal 2. The network address information may be an IP address and/or a MAC address.

It may be understood that the browser application of the controlling user terminal and the browser application of the user terminal 2 may be browser applications of a same operator, or may be browser applications of different operators. The browser application of the controlling user terminal and the browser application of the user terminal 2 may be browser applications that are agreed on in advance to be shared. In the first implementation, regardless of whether the browser application of the controlling user terminal and the browser application of the user terminal 2 are browser applications of a same operator or different operators, by means of the application identifier, the document data in the browser application of the controlling user terminal and in the browser application of the user terminal 2 can be synchronized. In the second implementation, regardless of whether the browser application of the controlling user terminal and the browser application of the user terminal 2 are browser applications of a same operator or different operators, both the browser application of the controlling user terminal and the browser application of the user terminal 2 can recognize each other and synchronize the document data.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

Figure 13:
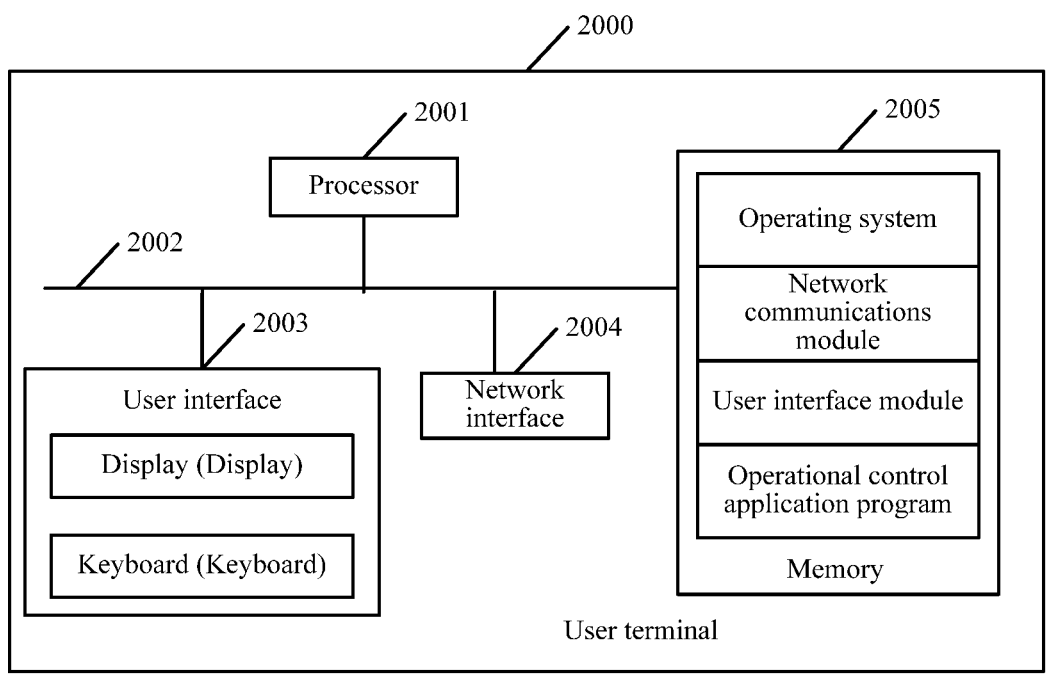
FIG. 13 is a schematic structural diagram of another user terminal according to an embodiment of the present disclosure.

Referring to FIG. 13, FIG. 13 is a schematic structural diagram of another user terminal according to an embodiment of the present disclosure. As shown in FIG. 13, the user terminal 2000 may include at least one processor 2001 such as a CPU, at least one network interface 2004, a user interface 2003, a memory 2005, and at least one communications bus 2002. The communications bus 2002 is configured to implement connection and communication between the components. The user interface 2003 may include a display, a keyboard, and optionally, the user interface 2003 may further include a standard wired interface and/or a standard wireless interface. Optionally, the network interface 2004 may include a standard wired interface and/or a standard wireless interface (such as a WiFi interface). The memory 2005 may be a high-speed RAM memory, or may be a non-volatile memory, for example, at least one magnetic disk memory. Optionally, the memory 2005 may further be at least one storage apparatus that is located far away from the processor 2001. As shown in FIG. 13, the memory 2005, which is used as a computer storage medium, may include an operating system, a network communications module, a user interface module, and an operational control application program.

In the user terminal 2000 shown in FIG. 13, the user interface 2003 is mainly configured to: provide an input interface for a user, and obtain data entered by the user. The network interface 2004 is mainly configured to transmit data and an instruction with a controlling user terminal. The processor 2001 may be configured to invoke the operational control application program stored in the memory 2005 and specifically perform the following operations:

receiving instruction information sent by a controlling user terminal based on a browser application of the controlling user terminal, and obtaining an operational control instruction corresponding to the instruction information; and operating, by using the operational control instruction, document data in a browser application of the user terminal 2000;

the instruction information being obtained by the controlling user terminal according to an operation instruction entered for the document data in the first browser application of the controlling user terminal.

In an embodiment, before performing the step of receiving instruction information sent by a controlling user terminal based on a browser application of the controlling user terminal, the processor 2001 further performs the following operation: establishing a binding relationship between the browser application of the controlling user terminal and the browser application of the user terminal 2000 with the controlling user terminal.

In an embodiment, when performing the step of establishing a binding relationship between the browser application of the controlling user terminal and the browser application of the user terminal 2000 with the controlling user terminal, the processor 2001 specifically performs the following operations:

logging in, based on an application identifier, to an application server corresponding to the browser application of the user terminal 2000, so that the application server establishes the binding relationship between the browser application of the controlling user terminal and the browser application of the user terminal 2000; or obtaining network address information of the controlling user terminal, and establishing a communication connection with the controlling user terminal by using the network address information of the controlling user terminal, to establish the binding relationship between the browser application of the controlling user terminal and the browser application of the user terminal 2000.

In this embodiment of the present disclosure, in a process of presenting document data, by means of instruction information agreed on by browser applications of user terminals, an operation instruction entered by a user on a controlling user terminal for the document data is converted into an operational control instruction for document data in a target user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

Figure 14:
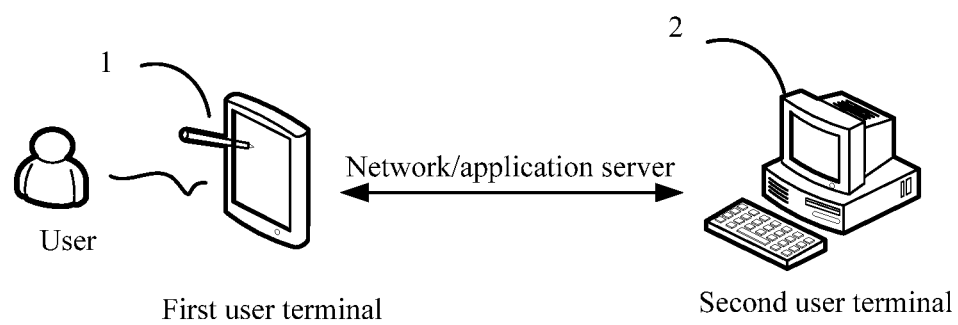
FIG. 14 is a schematic structural diagram of a system for operating and controlling data according to an embodiment of the present disclosure.

Referring to FIG. 14, FIG. 14 is a schematic structural diagram of a system for operating and controlling data according to an embodiment of the present disclosure. As shown in FIG. 14, the system may include a first user terminal 1 and a second user terminal 2. The first user terminal 1 and the second user terminal 2 may be connected with each other by using a network or an application server. The first user terminal 1 is specifically the user terminal 1 in the embodiment shown in FIG. 8 or FIG. 9. The second user terminal 2 may be specifically the user terminal 2 in the embodiment shown in FIG. 11 or FIG. 12. Alternatively, the first user terminal 1 may be the user terminal 1000 in the embodiment shown in FIG. 10, and the second user terminal 2 may be the user terminal 2000 in the embodiment shown in FIG. 13.

The first user terminal 1 is configured to: obtain an operation instruction entered for document data in a browser application of the first user terminal 1, and obtain instruction information corresponding to the operation instruction.

The first user terminal 1 is further configured to send the instruction information to the second user terminal 2 based on the browser application of the first user terminal 1.

The second user terminal 2 is configured to: receive the instruction information sent by the first user terminal 1, and obtain an operational control instruction corresponding to the instruction information.

The second user terminal 2 is further configured to operate, by using the operational control instruction, the document data in a browser application of the second user terminal 2.

In an embodiment, the first user terminal 1 is further configured to establish a binding relationship between the browser application of the first user terminal 1 and the browser application of the second user terminal 2 with the second user terminal 2.

In an embodiment, the first user terminal 1 being configured to establish a binding relationship between the browser application of the first user terminal 1 and the browser application of the second user terminal 2 with the second user terminal 2 specifically includes:

the first user terminal 1 being configured to log in, based on an application identifier, to an application server corresponding to the browser application of the first user terminal 1;

the second user terminal 2 being configured to log in, based on the application identifier, to the application server corresponding to the browser application of the second user terminal 2; and the application server being configured to establish the binding relationship between the browser application of the first user terminal 1 and the browser application for the second user terminal 2.

In an embodiment the first user terminal 1 being configured to establish a binding relationship between the browser application of the first user terminal 1 and the browser application of the second user terminal 2 with the second user terminal 2 specifically includes:

the first user terminal 1 being configured to: obtain network address information of the second user terminal 2, and establish a communication connection with the second user terminal 2 by using the network address information of the second user terminal 2, to establish the binding relationship between the browser application of the first user terminal 1 and the browser application of the second user terminal 2; or the second user terminal 2 being configured to: obtain network address information of the first user terminal 1, and establish a communication connection with the first user terminal 1 by using the network address information of the first user terminal 1, to establish the binding relationship between the browser application of the first user terminal 1 and the browser application of the second user terminal 2.

In an embodiment, the operation instruction is specifically any one of an instruction for opening the document data, an instruction for turning pages of the document data, and an instruction for closing the document data.

In the embodiments of the present disclosure, in a process of presenting document data, by means of instruction information agreed on by browser applications of user terminals, an operation instruction entered by a user on a first user terminal for the document data is converted into an operational control instruction for document data in a second user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved.

In this embodiment of the present disclosure, in a process of presenting document data, by means of instruction information agreed on by browser applications of user terminals, an operation instruction entered by a user on a first user terminal for the document data is converted into an operational control instruction for document data in a second user terminal, and a synchronization operation for document data of multiple user terminals is further implemented. In addition, the document data is presented based on a plug-in capability of the browser applications, it is ensured that a user terminal can be compatible with document data of different data formats, a case in which presentation cannot be performed is avoided, and a presentation effect of the document data is improved. Because a binding relationship is established between different browser applications, stability of a connection between the browser applications is ensured, stability of the synchronization operation for the document data of the multiple user terminals is further ensured, and a presentation effect of the document data is further improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory, or a random access memory.

What is claimed is:

1. A method of using a first user terminal to control presentation of a document on a second user terminal, the method comprising:

obtaining, by the first user terminal, a first operation instruction entered for document data in a first browser application of the first user terminal, wherein the operation instruction includes at least one of opening the document, page-turning the document, and closing the document, and wherein the first user terminal pre-stores a first instruction correlation list associating the first operation instruction with instruction correlation information;

obtaining, by the first user terminal, the instruction correlation information associated with the first operation instruction according to the first instruction correlation list;

sending, by the first user terminal, the instruction correlation information to the second user terminal, wherein the second user terminal pre-stores a second instruction correlation list associating the instruction correlation information with second operation instruction, and wherein the instruction correlation information is agreed upon in advance by the first and second user terminals in associating the first operation instruction at the first user terminal with the second operation instruction at the second user terminal;

receiving, by the second user terminal, the instruction correlation information sent by the first user terminal;

obtaining, by the second user terminal, the second operation instruction associated with the instruction information according to the second instruction correlation list; and operating, by the second user terminal according to the second operation instruction, the document data in a second browser application of the second user terminal.

2. The method according to claim 1, wherein the instruction correlation information is agreed upon in advance of obtaining by the first user terminal of the first operation instruction via a binding relationship established between a first browser application of the first user terminal and a second browser application of the second user terminal.

3. The method according to claim 2, wherein establishing the binding relationship further includes:

logging in, by the first user terminal based on an application identifier, to an application server;

logging in, by the second user terminal based on the application identifier, to the application server; and establishing, by the application server, the binding relationship between the first browser application of the first user terminal and the second browser application of the second user terminal.

4. The method according to claim 2, wherein establishing the binding relationship further includes:

obtaining, by the first user terminal, network address information of the second user terminal; and
establishing a communication connection with the second user terminal via the network address information of the second user terminal, to establish the binding relationship.

5. The method according to claim 2, wherein establishing the binding relationship further includes:
obtaining, by the second user terminal, network address information of the first user terminal; and
establishing a communication connection with the first user terminal via the network address information of the first user terminal, to establish the binding relationship.

6. The method according to claim 2, wherein establishing the binding relationship further includes:
synchronizing the document data on the first browser application with the second browser application.

7. The method according to claim 1, wherein a format of the document data is compatible with a first plug-in of the first browser application, and is compatible with a second plug-in of the second browser application.

8. The method according to claim 1, wherein the first operation instruction includes an instruction of opening the document, and wherein obtaining the instruction correlation information includes:
obtaining, by the first user terminal, instruction correlation information in a form of a numeral corresponding to the instruction of opening the document; and
sending the instruction correlation information in a form of a numeral to the second user terminal.

9. A first user terminal, comprising: a memory, and a processor coupled to the memory, wherein the processor is configured to:
obtain a first operation instruction entered for document data in a first browser application of the first user terminal, wherein the first operation instruction includes at least one of opening the document, page-turning the document, and closing the document, and wherein the first user terminal pre-stores a first instruction correlation list associating the first operation instruction with instruction correlation information;
obtain the instruction correlation information corresponding to the first operation instruction according to the first instruction correlation list; and
send the instruction correlation information to a target user terminal, wherein the target user terminal pre-stores a second instruction correlation list associating the instruction correlation information with a second operation instruction, and wherein the instruction correlation information is agreed upon in advance by the first and target user terminals in associating the first operation instruction at the first user terminal with the second operation instruction at the target user terminal.

10. The user terminal according to claim 9, wherein the processor is further configured to:
establish a binding relationship between the first browser application of the first user terminal and the second browser application of the target user terminal with the target user terminal; and
have the instruction correlation information agreed upon between the first and target user terminals via the binding relationship.

11. The user terminal according to claim 10, wherein the processor is further configured to:
log in, based on an application identifier, to an application server corresponding to the first browser application of the first user terminal to establish the binding relationship between the first browser application of the first user terminal and the second browser application of the target user terminal.

12. The user terminal according to claim 10, wherein the processor is further configured to:
obtain network address information of the target user terminal; and
establish a communication connection with the target user terminal via the network address information of the target user terminal, to establish the binding relationship between the first browser application of the first user terminal and the second browser application of the target user terminal.

13. The user terminal according to claim 9, wherein a format of the document data is compatible with a first plug-in of the first browser application.

14. A target user terminal on which presentation of a document is controlled by a controlling user terminal, the target user terminal comprising: a memory, and a processor coupled to the memory, wherein the processor is configured to:
receive instruction correlation information sent by the controlling user terminal based on a first browser application of the controlling user terminal, wherein the controlling user terminal pre-stores a first instruction correlation list associating the instruction correlation information with first operation instruction entered for document data in a first browser application of the controlling user terminal, and wherein the operation correlation instruction includes at least one of opening the document, page-turning the document, and closing the document;
obtain a second operation instruction corresponding to the instruction correlation information, wherein the target user terminal pre-stores a second instruction correlation list associating the instruction correlation information with the second operation instruction, and wherein the instruction correlation information is agreed upon in advance by the controlling and target user terminals in associating the first operation instruction at the controlling user terminal with the second operation instruction at the target user terminal; and
operate, according to the second operation instruction, document data in a second browser application of the target user terminal.

15. The user terminal according to claim 14, wherein the processor is further configured to:
establish a binding relationship between the first browser application of the controlling user terminal and the second browser application of the target user terminal with the controlling user terminal to have the instruction information agreed upon between the controlling and target user terminals via the binding relationship.

16. The user terminal according to claim 15, wherein the processor is further configured to:
log in, based on an application identifier, to an application server corresponding to the second browser application of the target user terminal to establish the binding relationship between the first browser application of the controlling user terminal and the second browser application of the target user terminal.

17. The user terminal according to claim 15, wherein the processor is further configured to:
obtain network address information of the controlling user terminal; and establish a communication connection with the controlling user terminal via the network address information of the controlling user terminal, to establish the binding relationship between the first browser application of the controlling user terminal and the second browser application of the user terminal.

18. The first user terminal according to claim 9, wherein the first operation instruction includes an instruction of opening the document, and wherein obtaining the instruction information comprises:

obtaining, by the first user terminal, instruction correlation information in a form of a numeral corresponding to the instruction of opening the document; and sending the instruction correlation information in a form of a numeral to the target user terminal.

19. The target user terminal according to claim 14, wherein the first operation instruction includes an instruction of opening the document, and wherein obtaining the instruction information comprises:

obtaining, by the controlling user terminal, instruction correlation information in a form of a numeral corresponding to the instruction of opening the document; and sending the instruction correlation information in a form of a numeral to the target user terminal.

* * * * *